United States Patent

Moran

[15] 3,660,126

[45] May 2, 1972

[54] ASHPHALT COMPOSITIONS CONTAINING POLYAMIDE

[72] Inventor: Charles E. Moran, Pinole, Calif.

[73] Assignee: Chevron Research Company, San Francisco, Calif.

[22] Filed: Jan. 16, 1970

[21] Appl. No.: 3,530

[52] U.S. Cl. .............................. 106/279, 117/123, 208/22, 117/135.5, 117/140, 117/168, 208/39, 208/44

[51] Int. Cl. ............... CO8h 13/00, CO8h 17/22, CO8j 1/46

[58] Field of Search .............................. 106/142, 273–284; 117/135.5, 140, 123, 168; 260/404.5; 94/20, 23; 208/22, 44, 39; 252/311.5, 62

[56] References Cited

UNITED STATES PATENTS

| | | | |
|---|---|---|---|
| 2,425,392 | 8/1947 | Robinson et al. | 260/404.5 |
| 2,663,648 | 12/1953 | Jelling | 106/273 |
| 2,805,135 | 9/1957 | Bell et al. | 260/404.5 |
| 2,996,398 | 8/1961 | Huber et al. | 106/273 x |
| 3,326,801 | 6/1967 | Schlobohm et al. | 260/404.5 x |

FOREIGN PATENTS OR APPLICATIONS

| | | | |
|---|---|---|---|
| 202,236 | 5/1956 | Australia | 106/273 |

Primary Examiner—Joan B. Evans
Attorney—A. L. Snow, F. E. Johnston, G. F. Magdeburger and B. I. Rowland

[57] ABSTRACT

A composition comprised of from about 70 to about 95 percent by weight asphalt and from about 30 to about 5 percent by weight of N,N'-distearyl-ethylenediamide, preferably from about 85 to about 92 percent, and from about 15 to about 8 percent, respectively, has desirable properties with regard to softening point, viscosity, and penetration.

4 Claims, No Drawings

ASPHALT COMPOSITIONS CONTAINING POLYAMIDE

BACKGROUND OF THE INVENTION

1. Field of the Invention

Asphalt-based compositions are widely used to provide waterproof coatings on a wide variety of materials. Among these materials are roofing felts, concrete and masonry structures, insulating sheets, and casings of various types.

When coating the internal surface of cylindrical casings and other similar structure, certain problems arise. When the casing is of relatively small diameter, attempts to spread the asphalt composition over the internal surface by means of a brush or roller are ineffective. If the composition is sprayed on the internal surface, the asphalt tends to run off, thereby giving uneven coating.

Since one of the fastest and most economical manners in which the internal surface of casings can be coated is to inject a spray of the asphalt-based material into the interior of the casing while spinning the casing or conversely, the sprayer head, a composition which will set up quickly to avoid running is highly desirable. Unfortunately, to enable asphalts to be sprayed, high temperatures are required to reduce the viscosity. This has the effect of rapidly heating the casing, particularly where it is metallic, so that the asphalt does not cool fast enough to prevent its running off. One method of solving this problem is to cool the outside surface of the casing by use of a cooling medium such as a water spray. However, this method requires the setup of additional equipment, subsequent drying of the casing, and is not readily adaptable to the in-the-field use. Further, where the casing to be coated is cement or other similar material with a low thermal conductivity, the reduction in temperature of the outer surface does not reduce the temperature on the internal surface effectively.

Therefore, the development of an asphalt-based material which meets certain minimum standards with regard to softening point, viscosity, and penetration to prevent this running off and to provide useful coatings would be highly desirable. These minimum specifications are good fluidity of the coating composition at around 300° F., a fast setup, i.e., the coating becomes hard and will not run at about 150° to 200° F., and the coating does not become excessively hard at ambient and lower temperatures.

Further evidence of the desirability of a product with these features is shown by the requirements of Military Specification MIL-C-3301A for bomb cavity lining asphalt. The specification calls for a minimum penetration at 77° F. of 25, a softening point, R and B, of 235° F. minimum, and a viscosity at 300° F. of 700 cp. maximum (Brookfield L.V.F., No. 2 spindle at 12 rpm.). The material must not sag at 228° F. and no disintegration, browning, or dulling after 6 hours exposure to hydrochloric acid is permitted. After 18 hours exposure to water, the material may be no more than slightly dull. The material must not crack upon bending and must also have a minimum flash point, COC, of 500° F. It is believed that unmodified asphalt compositions per se do not fulfill all of these requirements.

2. Description of the Prior Art

U.S. Pat. No. 2,891,873 to Falkenburg et al. discloses and claims a bituminous composition comprised of asphalt and an additive in an amount of from 0.1 to 3 percent by weight of the asphalt. The additives serve as anti-stripping agents in asphaltic paving compositions for improving the adherence of the asphalt to wet or dry aggregates. Among the additives taught by the reference is the stearic acid compound of diethylene triamine having the formula:

U.S. Pat. No. 3,026,266 to Mertens et al. discloses asphaltic emulsions having incorporated therein from about 0.1 to about 1.5 percent of a polyamide product of condensation of polycarboxylic acid and acyclic polyalkylene polyamines.

SUMMARY OF THE INVENTION

A composition comprised of a major amount of an asphalt and a minor amount of N,N'-distearyl-ethylenediamide, has desirable properties with regard to softening point, viscosity, and penetration when used as a coating in applications where a fast setup is desired.

DETAILED DESCRIPTION OF THE INVENTION

The Composition

The composition of this invention comprises from about 70 to about 95 percent (preferably from about 85 to about 92 percent) by weight of an asphalt having a penetration of from 7 to about 50 and a softening point of from about 200° to about 300° F., and from about 30 to about 5 percent (preferably from about 15 to about 8) by weight of N,N'-distearyl-ethylenediamide.

The Asphalt

The asphalts of this invention may be selected from a range of asphaltic materials. The only criteria are that the penetration at 77° F. must be in the range from about 7 to about 50(ASTM D-5-65), and the softening point must be in the range of from about 200° to about 300° F. Airblown asphalts meet these criteria and are particularly useful. The low temperature rheological properties of the asphalt are affected relatively little by the additive. The desired low temperature rheological properties are, therefore, obtained by selecting the asphalt having these desired properties as the base material.

The preferred asphalt is Petrolastic Culvert Asphalt T-113 (a product of Chevron Asphalt Company). This asphalt has a penetration at 77° F. (ASTM-D-5-65) of 43, a viscosity at 300° F. of 10,700 cp., and a softening point of 222° F.

Another specific example of a satisfactory asphalt is Petrolastic Asphalt No. 3 (a product of Chevron Asphalt Company) having a penetration in the range of 30-35 at 77° F. (ASTM-D-5-65) and a softening point in the range of 200°–210° F.

The Diamide

The diamide used in this invention is N,N'-distearyl-ethylenediamide of the formula

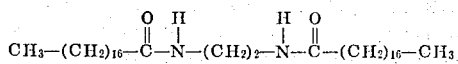

The diamide is a hard, light-colored, waxy material having a melting point of about 280° F., and a flash point of 530° F. C.O.C. It is soluble in hot naphtha, hot toluene, and most hot organic solvents. It is insoluble in water and in alcohols.

Preparation of the Composition

The composition is prepared by combining the ingredients with constant agitation at 300°–325° F. until a homogeneous mixture is obtained. Conventional mixing apparatus can be used, such as a heated tank with an impeller or with a sparge through which is bubbled steam or nitrogen to create agitation. The diamide can be added in the form of flakes to the hot asphalt or, alternatively, the diamide can also be heated to 300°–325° F. and the two constituents combined with stirring. The latter method is preferred to avoid lumps or non-homogeneous mixtures and to reduce the mixing time.

EXAMPLES

The compositions set forth in Table I were prepared by mixing the quantities of asphalt and diamide set forth in the table. The asphalt in each case, Petrolastic Culvert Paving Asphalt T-113 (as described earlier), was heated to 300° F. in an open vessel and the diamine in each case, Carlisle 780, N,N'-distearyl-ethylenediamide (as described earlier) was added in the form of flakes with constant mixing. Mixing was continued for ten minutes to insure homogeneity. The mixture was then allowed to cool and the viscosity, penetration, and softening point were subsequently measured with the results shown in Table I.

TABLE I

| Percent asphalt | Percent diamide | Penetration, 77° F. | Viscosity, 300° F. centipoise | Softening point |
| --- | --- | --- | --- | --- |
| 90 | 10 | 38 | 500 | 249 |
| 85 | 15 | 35 | 300 | 270 |
| 75 | 25 | 31 | 160 | 260 |

The compositions all satisfied the specifications set forth in Military Specification MIL-C-3301A. While not all of the asphalts specified as useful will meet the extremely stringent specifications of MIL-C-3301A, they are useful in similar applications where low viscosity at elevated temperatures with rapid setup is required.

As will be evident to those skilled in the art, various modifications on this invention can be made or followed, in the light of the foregoing disclosure and discussion, without departing from the spirit or scope of the disclosure; the invention is to be limited only as set forth in the following claims.

I claim:

1. A composition comprising from about 70 to about 95 percent by weight asphalt having a penetration of from about 7 to about 50 and a softening point of from about 200° to about 300° F., and from about 30 to about 5 percent by weight N,N'-distearyl-ethylenediamide.

2. Claim 1, wherein said asphalt is present in an amount of from about 85 to about 92 percent by weight and said diamide is present in an amount of from about 15 to about 8 percent by weight.

3. Claim 2, wherein said asphalt has a softening point of about 222° F., a penetration at 77° F. of about 43, and a viscosity of 10,700 cp. at 300° F.

4. Claim 3, wherein said asphalt is present in an amount of about 90 percent by weight and said diamide is present in an amount of about 10 percent by weight.

* * * * *